UNITED STATES PATENT OFFICE.

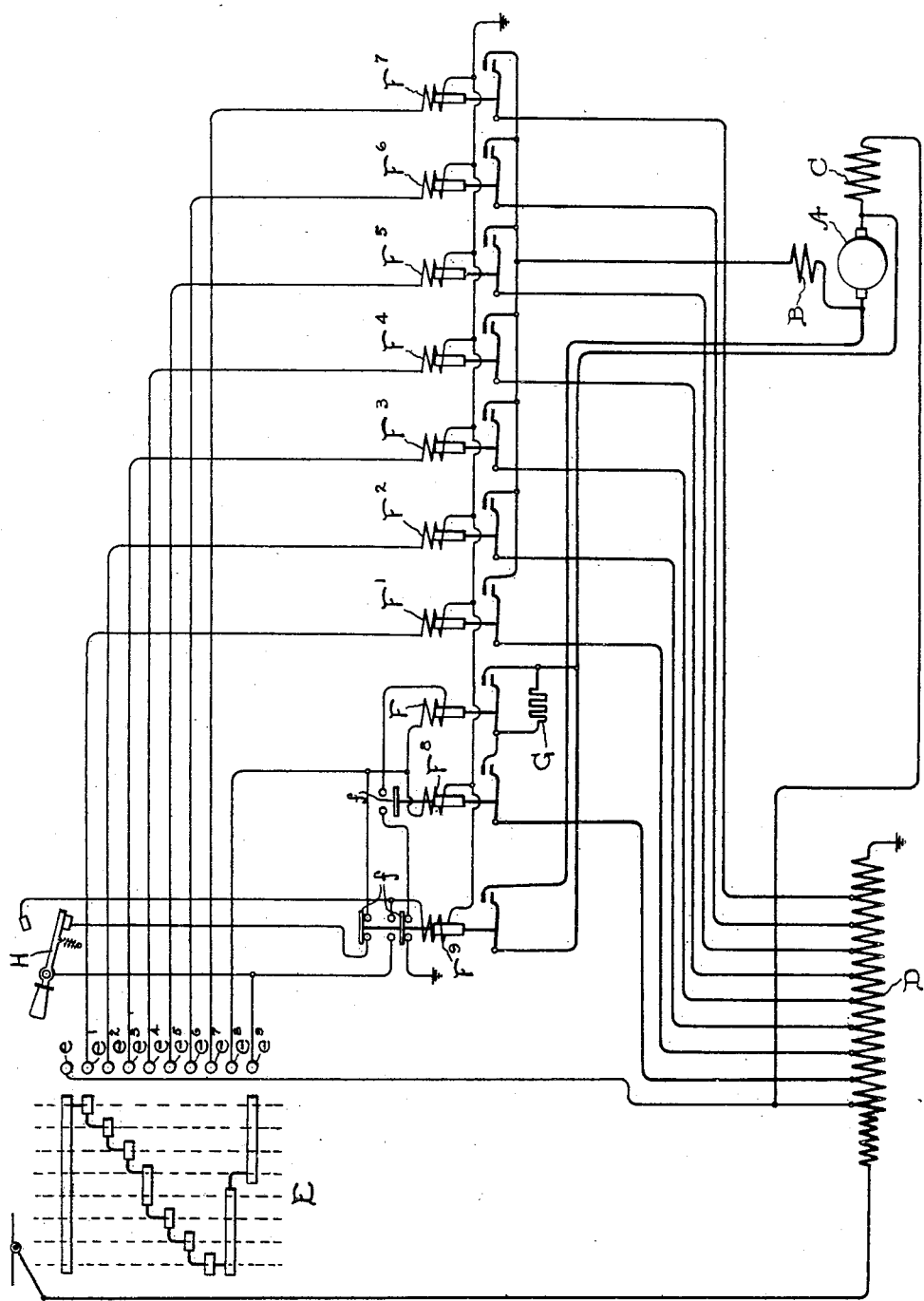

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE-MOTOR CONTROL.

No. 923,312.  Specification of Letters Patent.  Patented June 1, 1909.

Application filed August 6, 1908. Serial No. 447,187.

*To all whom it may concern:*

Be it known that I, ERNST F. W. ALEXANDERSON, a citizen of the United States, residing at Schenectady, county of Schenectady, State of New York, have invented certain new and useful Improvements in Single-Phase-Motor Control, of which the following is a specification.

My invention relates to the control of single-phase motors of the commutator type having exciting and compensating windings on the stator. In prior applications I have disclosed controlling systems for such motors in which the motors are started as repulsion motors with the armature short-circuited, and are operated when up to speed as series connected motors with a shunt voltage impressed on a part of the motor winding. When so connected I have termed the motors "series-repulsion motors."

If the motor controller is arranged to establish repulsion-motor connections in its low-speed positions and series repulsion connections in its high-speed positions, then, if, after the motor is up to speed, the motorman quickly throws the controller back to a low-speed position, the motor is connected as a repulsion motor, while running at high speed. The repulsion motor connection is not best adapted for running at high speed, and it is the avoidance of such a connection at high speed which is the object of my invention. For starting on light loads, the series repulsion connection is satisfactory, though not so good as the repulsion motor connection for heavy loads.

My invention consists in arranging the motor controller to connect the motor to the source as a series connected motor or with series-repulsion motor connections, and providing auxiliary means for short-circuiting the motor armature when starting under heavy loads.

My invention further consists in arranging the motor controller to open the armature short circuit, if established, when the controller reaches a high-speed position. I further provide interlocking connections between the short-circuiting means and those contacts of the controller which impress the shunt voltage on part of the motor winding, so that when the short-circuit is established, the shunt voltage is removed, and vice versa.

My invention will best be understood by reference to the accompanying drawing, which shows diagrammatically a motor control system arranged in accordance with my invention.

In the drawing, A represents the armature winding, B the exciting winding, and C the compensating winding, of a single-phase motor of the commutator type. When the motor has its armature short-circuited to start as a repulsion motor, the compensating winding might more properly be termed the inducing winding. In order to avoid unnecessary use of words, however, I shall refer to this winding at all times as a "compensating winding", it being understood that I mean thereby a winding on the stator arranged to produce a magnetization in line with that of the armature.

D represents a transformer or auto-transformer serving as a source of current for the motor.

E represents a master controller, which is shown diagrammatically with its contacts developed on a plane surface. This controller comprises ten figures $e$ to $e^9$ and movable contacts as shown.

F to $F^8$ represent nine electromagnetically actuated switches or contactors, which establish the different connections in the motor circuit, and which are controlled by the master controller E. These contactors and master controller form together what may be termed the controller for the motor. The contactors are numbered to correspond with the fingers of the master controller, to which they are connected.

G represents a resistance arranged to be short-circuited by the contactor F for the purpose which will hereinafter be described.

$F^9$ represents an auxiliary contactor, which when closed, short-circuits the motor armature. This contactor is not operated by the master controller itself, and remains inoperative, except when the motor is started under a heavy load. This contactor $F^9$, and also contactor $F^8$, are provided with interlocking contacts $f$.

H represents an auxiliary control switch, which may be either manually or automatically operated for energizing contactor $F^9$ for starting on heavy loads.

In starting on light loads, switch H is not actuated. Master controller E, in moving to its first operative position, as is indicated by the right-hand dotted line, establishes a circuit from transformer D, through contact fingers $e$ and $e^1$ to the winding of contactor $F^1$. This contactor closes, connecting a terminal of the exciting winding B to a point on the auto-transformer D next but one to the point to which a terminal of the compensating winding C is connected. The three motor windings are connected in series, so that the motor is thus connected as a series motor to a portion of the transformer winding B. At the same time a circuit is established from the transformer D through contact fingers $e$ and $e^9$, switch H, upper contact $f$ of contactor $F^9$, and through the winding of contactor $F^8$ to ground. Contactor $F^8$ is thus energized connecting the junction of armature and compensating windings through resistance G to a point on the transformer intermediate the points to which the terminals of the motor circuit are connected. A shunt voltage is thus impressed on the exciting winding B and armature A in series. As soon as contactor $F^8$ closes its contact a circuit is closed through the winding of contactor F, contact $f$ of contactor $F^8$, lower contact $f$ of contactor $F^9$, to ground. Contactor F, therefore, closes its contact, short-circuiting the resistance G. In passing to its second position, the master controller E deënergizes contactor $F^1$ and energizes contactor $F^2$, so as to increase the voltage impressed on the motor circuit. Further increases are obtained when the master controller is moved to its third and fourth positions; contactors $F^3$ and $F^4$ being consecutively energized. In passing from position 4 to position 5 of switch E, the circuit of contactors $F^8$ and F is changed, but these contactors are not deënergized. Their circuit is merely shifted from contact finger $e^9$ to contact finger $e^8$, so that switch H and the upper contact $f$ of contactor $F^9$ are no longer included in the circuit of these windings. In passing to the sixth, seventh and eighth positions, contactors $F^5$, $F^6$ and $F^7$ are consecutively energized, thereby further increasing the voltage impressed on the motor circuit. Thus, as long as switch H is not operated, the motor is connected as a series-repulsion motor, both for starting and for running.

For starting on heavy loads, switch H, which may be operated either manually as shown or automatically as by a solenoid in the actuated motor circuit, is shifted to its other position. When this is done, the circuit connections for the first four positions of master controller E are altered. In the first position of the master controller a circuit is closed from transformer D through contact fingers $e$ and $e^1$ and contactor $F^1$, as before. Contactors $F^8$ and F are not, however, energized. On the contrary, a circuit is established through contact fingers $e$ and $e^9$, and switch H, to contactor $F^9$, which is, therefore, energized, and short-circuits the motor armature, so as to start the motor as a repulsion motor. When contactor $F^9$ is energized, it closes a maintaining circuit for itself, independent of switch H, through contact fingers $e$ and $e^9$ of the master controller, and through lower contact $f$ of contactor $F^9$. Consequently, switch H may be released as soon as contactor $F^9$ is energized, without deënergizing the contactor. The upper contact $f$ of contactor $F^9$ opens the connection from contact finger $e^9$ to contactor $F^8$, so that although switch H is released, contactor $F^8$ is not energized as long as contactor $F^9$ remains energized. In passing through the second, third and fourth positions of the master controller, the voltage impressed on the motor is gradually increased by energizing contactors $F^2$, $F^3$ and $F^4$ consecutively, as before. The short circuit on the armature is maintained so that the motor continues to operate as a repulsion motor. When the master controller is moved from its fourth to its fifth position, contactor $F^8$ is energized through contact finger $e^8$, and contactor $F^9$ is then deënergized by the open-circuiting of contact finger $e^9$. Though contactor $F^8$ closes before contactor $F^9$ opens, contactor F, which short-circuits the resistance G in circuit with the contact of contactor $F^8$, cannot be energized until contactor $F^9$ is deënergized, since the circuit of the winding of contactor F runs through the lower contact $f$ of contactor $F^9$. When the fifth position of the master controller is reached, the motor is again operating as a series repulsion motor, and its connections for the rest of the high-speed positions are precisely the same as though switch H had not been actuated at starting. Furthermore, on returning switch E to off position, the repulsion motor connections are not reëstablished, for, in passing from its fifth to its fourth position, the master controller merely shifts the connections of contactors $F^8$ and F from contact finger $e^8$ to contact finger $e^9$; the circuit of contactor $F^9$ being open at its lower contact $f$ and at switch H, so that contactor $F^9$ is not energized. Thus, all danger of reëstablishing the repulsion motor connections, when the motor is operating at high speed, is removed.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, and auxiliary means for short-circuiting the motor armature for starting under heavy load.

2. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, and auxiliary means for short-circuiting the motor armature for starting under heavy load, said controller being arranged to open the armature short-circuit, if established, when it reaches a high-speed position.

3. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, said controller comprising contacts for impressing a shunt voltage from said source on a part of the motor windings, auxiliary means for short-circuiting the motor armature for starting under heavy load and interlocking connections between said auxiliary means and said contacts of the controller.

4. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, and auxiliary means for short-circuiting the motor armature for starting under heavy load, the short circuit, when established, being under the control of said controller.

5. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, a normally-open switch arranged when closed to short-circuit the motor armature, and auxiliary controlling means for closing said switch for starting under heavy load.

6. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, a normally open switch arranged when closed to short-circuit the motor armature, and auxiliary controlling means for closing said switch for starting under heavy load, said controller being arranged to control said switch to open it when said controller reaches a high speed position.

7. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, said controller comprising contacts for impressing a shunt voltage from said source on a part of the motor windings, a normally-open switch arranged when closed to short-circuit the motor armature, auxiliary controlling means for closing said switch for starting under heavy load, and interlocking connections between said switch and said contacts of the main controller.

8. In combination with a single-phase motor of the commutator type having exciting and compensating windings on the stator, a source of current therefor, a controller for said motor arranged to connect the motor to the source as a series connected motor both for starting and for running and to vary the voltage impressed on the motor for operation at different speeds, a normally-open magnetically actuated switch arranged when closed to short-circuit the motor armature, auxiliary controlling means for energizing the actuating winding of said switch for starting under heavy load, and a maintaining circuit for said actuating winding including contacts of the main controller.

In witness whereof, I have hereunto set my hand this 5th day of August, 1908.

ERNST F. W. ALEXANDERSON.

Witnesses:
BENJAMIN F. HULL,
HELEN ORFORD.